(12) United States Patent
Hu

(10) Patent No.: US 11,074,669 B2
(45) Date of Patent: Jul. 27, 2021

(54) METHOD FOR DERIVING ADDITIONAL AND FURTHER PICTURES FROM AN ORIGINAL PICTURE, AND DEVICE APPLYING THE METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Po-Chang Hu, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 167 days.

(21) Appl. No.: 16/521,677

(22) Filed: Jul. 25, 2019

(65) Prior Publication Data

US 2020/0273143 A1 Aug. 27, 2020

(30) Foreign Application Priority Data

Feb. 26, 2019 (CN) .......................... 201910141909.1

(51) Int. Cl.
*G06T 3/00* (2006.01)
*G06N 20/00* (2019.01)
*G06K 9/62* (2006.01)
*G06F 40/169* (2020.01)

(52) U.S. Cl.
CPC .......... *G06T 3/0006* (2013.01); *G06F 40/169* (2020.01); *G06K 9/6256* (2013.01); *G06N 20/00* (2019.01)

(58) Field of Classification Search
CPC ..... G06K 9/6256; G06N 20/00; G06T 3/0006
See application file for complete search history.

(56) References Cited

U.S. PATENT DOCUMENTS

2019/0180094 A1* 6/2019 Zagaynov ............ G06K 9/6256

* cited by examiner

*Primary Examiner* — Manuchehr Rahmjoo
(74) *Attorney, Agent, or Firm* — ScienBiziP, P.C.

(57) ABSTRACT

A method for deriving further and additional pictures from an original picture, for Artificial Intelligence (AI) training purposes, is applied in a device. The device establishes an original picture set and sets the original pictures as a training picture set for AI training. The original pictures are rotated or flipped or both to obtain amplification pictures. The original pictures are annotated, and each of the amplification pictures is annotated according to a preset conversion rule. The original pictures, the amplification pictures, the annotated original pictures, and the annotated amplification pictures are stored, for inclusion in the AI training picture set.

17 Claims, 5 Drawing Sheets

| Annotation item | Figure | Coordinate value | Formula |
|---|---|---|---|
| Original picture | | $S=(7,5)$<br>$A=(4,3)$<br>$Bbox=(4,3,2,1)$ | $S=Size=(Sx, Sy)$<br>$A=(X, Y)$<br>$Bbox=(Xmin, Ymin, Width, Height)$ |
| Flip picture | | $S_\perp'=(7,5)$<br>$A_\perp'=(4,1)$<br>$Bbox_\perp'=(4,0,2,1)$ | $S_\perp'=(Sx, Sy)$<br>$A_\perp'=(X, Sy-1-Y)$<br>$Bbox_\perp'=(Xmin, Sy-1-Ymin-Height, Width, Height)$ |
| Picture which are acquired by rotating the original picture at 90 degrees | | $S_{90°}'=(5,7)$<br>$A_{90°}'=(3,2)$<br>$Bbox_{90°}'=(3,0,1,2)$ | $S_{90°}'=(Sx, Sy)$<br>$A_{90°}'=(X, Sy-1-Y)$<br>$Bbox_{90°}'=(Xmin, Sy-1-Ymin-Height, Width, Height)$ |
| Picture which are acquired by rotating the original picture at 180 degrees | | $S_{180°}'=(5,7)$<br>$A_{180°}'=(3,2)$<br>$Bbox_{180°}'=(3,0,1,2)$ | $S_{180°}'=(Sx, Sy)$<br>$A_{180°}'=(Sx-1-X, Sy-1-Y)$<br>$Bbox_{180°}'=(Sx-1-Xmin-Width, Sy-1-Ymin-Height, Width, Height)$ |
| Picture which are acquired by rotating the original picture at 270 degrees | | $S_{270°}'=(5,7)$<br>$A_{270°}'=(1,4)$<br>$Bbox_{270°}'=(0,4,1,2)$ | $S_{270°}'=(Sx, Sy)$<br>$A_{270°}'=(Sx-1-X, Sy-1-Y)$<br>$Bbox_{270°}'=(Sx-1-Xmin-Width, Sy-1-Ymin-Height, Width, Height)$ |

FIG. 5

METHOD FOR DERIVING ADDITIONAL AND FURTHER PICTURES FROM AN ORIGINAL PICTURE, AND DEVICE APPLYING THE METHOD

This application claims priority to Chinese Patent Application No. 201910141909.1 filed on Feb. 26, 2019, the contents of which are incorporated by reference herein.

FIELD

The subject matter herein generally relates to data processing.

BACKGROUND

In the prior art, AI model training pictures obtained from a production line are limited by equipment, cost, time, and other factors, so that the number of pictures used for training may not be sufficient, thereby reducing the accuracy of the AI deep learning model.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 5 is a block diagram of an embodiment of a table.

DETAILED DESCRIPTION

Figure 1:
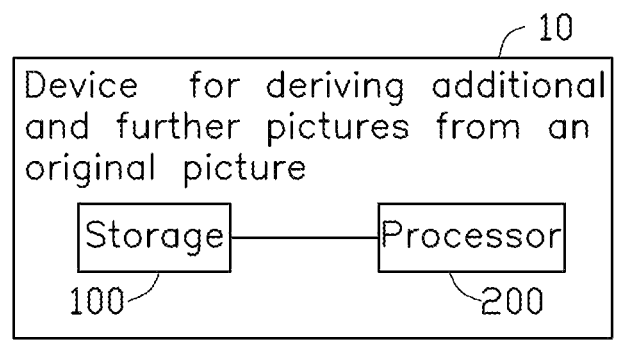
FIG. 1 is a block diagram of an embodiment of a device for deriving additional and further pictures from an original picture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a device 10 for deriving additional and further pictures from an original picture. The device 10 includes a storage 100 and a processor 200. The storage 100 is connected to the processor 200. In one embodiment, the storage 100 stores an amount of data of the device 10. The amount of data can be, but is not limited to, a program code for picture flipping or rotation, annotation, and annotation conversion. In at least one exemplary embodiment, the storage 100 can include various types of non-transitory computer-readable storage mediums. For example, the storage 100 can be an internal storage system of the target service provider server 1, such as a flash memory, a random access memory (RAM) for temporary storage of information, a read-only memory (ROM) for permanent storage of information, a Programmable Read-Only Memory (PROM), an Erasable Programmable Read-Only Memory (EPROM), a One-time Programmable Read-Only Memory (OTPROM), an Electrically-Erasable Programmable Read-Only Memory (EEPROM), and/or a Compact Disc Read-Only Memory (CD-ROM). In another embodiment, the storage 100 can also be an external storage system, such as a hard disk, a storage card, or a data storage medium. In the embodiment, the processor 200 can be a central processing unit, or a common processor, a digital signal processor, a dedicated integrated circuit, ready-made programmable gate arrays, or other programmable logic devices, discrete door or transistor logic devices, discrete hardware components, and so on. In another embodiment, the processor 200 can be a microprocessor or any conventional processor. The processor 200 can also be a control center of the device 10, using various interfaces and lines to connect the various parts of the device 10.

In one embodiment, the device 10 can amplify and annotate original pictures to get amplification pictures. In one embodiment, the original picture can be used as a new picture for AI deep learning model training to improve the accuracy of AI deep learning model as long as there is a change from the original picture. Both the original pictures and the amplification pictures stored in the memory 100 are annotated respectively by the unified annotation format, which is used to train the AI deep learning model.

The device 10 flips the original picture to get a flipped picture. Therefore, the original picture and the flipped picture form a mirror symmetry. In one embodiment, the original picture can be flipped vertically or horizontally or both.

The device 10 rotates the original picture at a preset angle to get a first amplifying picture. In one embodiment, the preset angle can be in a range between 0 degrees and 360 degrees. When the original picture is rotated by a slight angle to produce a change, the original picture so rotated can be a new training picture for the AI deep learning model.

Similarly, a second amplifying picture can be acquired by rotating the original picture at the preset angle. The first amplification picture and the second amplification picture form a amplification picture set, which is used to increase the number of pictures for training in the AI deep learning model.

The original picture and the flipped picture are rotated K times in the same direction to get the first amplification picture and the second amplification picture. Each rotation angle can be calculated according to formula θ=(2×270°)/N, wherein K is calculated according to formula K=(N/2)−1, N is a multiple of the number of the amplification pictures (namely the first amplification picture and the second amplification picture) and N is an even number. Depending on the required multiplication of pictures, the original picture or the flipped pictures are rotated 90 degrees, 180 degrees, or 270 degrees.

In one embodiment, the original picture, the flipped picture, the first amplification picture and the second amplification picture are stored in the preset storage address of the storage 100, for annotation process.

The program code stored in the storage 100 is also for annotating the original picture. Such process includes calculating dimensional coordinates of the original picture, a point coordinate of annotation site in the original picture, and a format coordinate of annotation site in the original picture. The annotation site in the original picture is obtained by using segmentation method, which is a way of annotating a picture that depicts the outline frame of the picture's annotation site in the form of polygonal point coordinates.

In one embodiment, the dimensional coordinates correspond to the outline of the original picture that represents the original picture, and the dimensional coordinates here are represented by S. A value of the dimensional coordinates is measured by the number of unit areas of the dimensional coordinates. In one embodiment, the values of the dimensional coordinates of one unit area of the original picture are two, in both horizontal and vertical axes of the dimensional coordinates. The values of the dimensional coordinates of two unit areas arrange horizontally in the original picture are three, in horizontal axes, the values of the dimensional coordinates of two unit areas arrange horizontally in the original picture are two in vertical axes. The value of the dimensional coordinates of n unit areas arrange horizontally or vertically in the original picture are n+1 in the horizontal axes of the dimensional coordinate or in the vertical axes of the dimensional coordinate, wherein n is the number of unit areas. The point coordinate is one of the point coordinates in the annotation site of the original picture, represented by A. The format coordinate consists of the minimum horizontal axes coordinate value of the annotation site, the minimum vertical axes coordinate value of the annotation site, the width of the annotation site, and the height of the annotation site. The format coordinate is represented by a bounding box (Bbox). The Bbox is a rectangle that can cover the annotation point of the original picture.

In one embodiment, the program code stored in the storage 100 is also for annotating the amplification picture. In one embodiment, the flipped picture, the first amplification picture, and the second amplification picture are all together the amplification picture.

In one embodiment, the dimensional coordinate of the amplification picture is acquired by converting the coordinate value of the dimensional coordinate of the original picture. The dimensional coordinate of the amplification picture is represented by S'. The point coordinates of the annotation site of the amplification picture are obtained by converting the coordinate value of the point coordinate and the coordinate value of the dimensional coordinate in the annotation site of the original picture, which is represented by A'. The format coordinate of the annotation site of the amplification picture is acquired by converting the coordinate value of the point coordinate and the coordinate value of the format coordinate in the annotation part of the original picture, which is represented by Bbox'.

Figure 2:
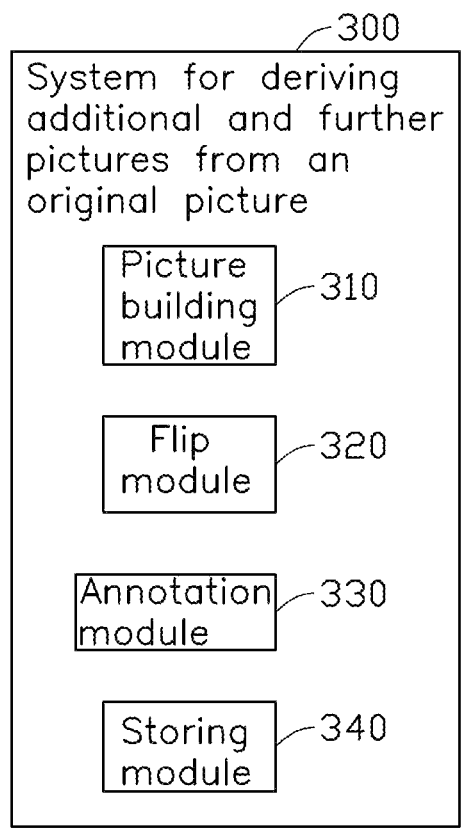
FIG. 2 is a block diagram of an embodiment of a system for deriving additional and further pictures from an original picture.

FIG. 2 illustrates system 300 for deriving additional and further pictures from an original picture, the system 300 includes one or more modules running in the device 10. The system 300 includes a picture building module 310, a flip module 320, an annotation module 330, and a storing module 340. In one embodiment, the picture building module 310, the flip module 320, the annotation module 330, and the storing module 340 are stored in the storage 100 of the device 10 and executed by the processor 200 of the device 10. In another embodiment, the picture building module 310, the flip module 320, the annotation module 330, and the storing module 340 are program segments or code embedded in the processor 200.

The picture building module 310 establishes an original picture set including a number of the original pictures, and sets the original pictures as a training picture set for training an AI deep learning model.

In one embodiment, the picture building module 310 acquires the original pictures from an external device, and establishes the original picture set according to the original pictures. The external device can be a picture database.

In another embodiment, the picture building module 310 annotates the original picture and establishes the training picture set according to the annotated original pictures for training the AI deep learning model.

The flip module 320 rotates or flips the number of original pictures to get amplification pictures and puts the amplification pictures in the training picture set for training the AI deep learning model.

In one embodiment, the flip module 320 flips and rotates the original picture to get the amplification pictures and establishes an amplification picture set based on the amplification pictures. The amplification picture set is used to increase the number of the training pictures for training the AI deep learning model.

In one embodiment, the flip module 320 flips the original picture to get the flip picture, so that the original picture is mirrored symmetrically with the flip picture. In one embodiment, the flip module 320 rotates the original picture through a preset angle to get the first amplification picture and rotates the flip picture in the same direction through the same angle to get the second amplification picture. In at least one embodiment, the preset angle is in a range between 0° and 360°.

In one embodiment, the flip module 320 rotates the original picture K times at the preset angle to get the first amplification pictures, and rotates the flipped picture K times at the preset angle in the same direction to get the second amplification pictures. The first amplification pictures and the second amplification pictures form the training pictures. The preset angle can be calculated according to formula θ=(2×270°)/N, wherein K is calculated according to formula K=(N/2)−1, N is a multiple of the number of the amplification pictures (namely the first amplification picture and the second amplification picture) and N is an even number. Depending on the number of derivations which are desired, the original picture or the flipped pictures are rotated 90 degrees, 180 degrees, or 270 degrees, respectively.

Figure 3:
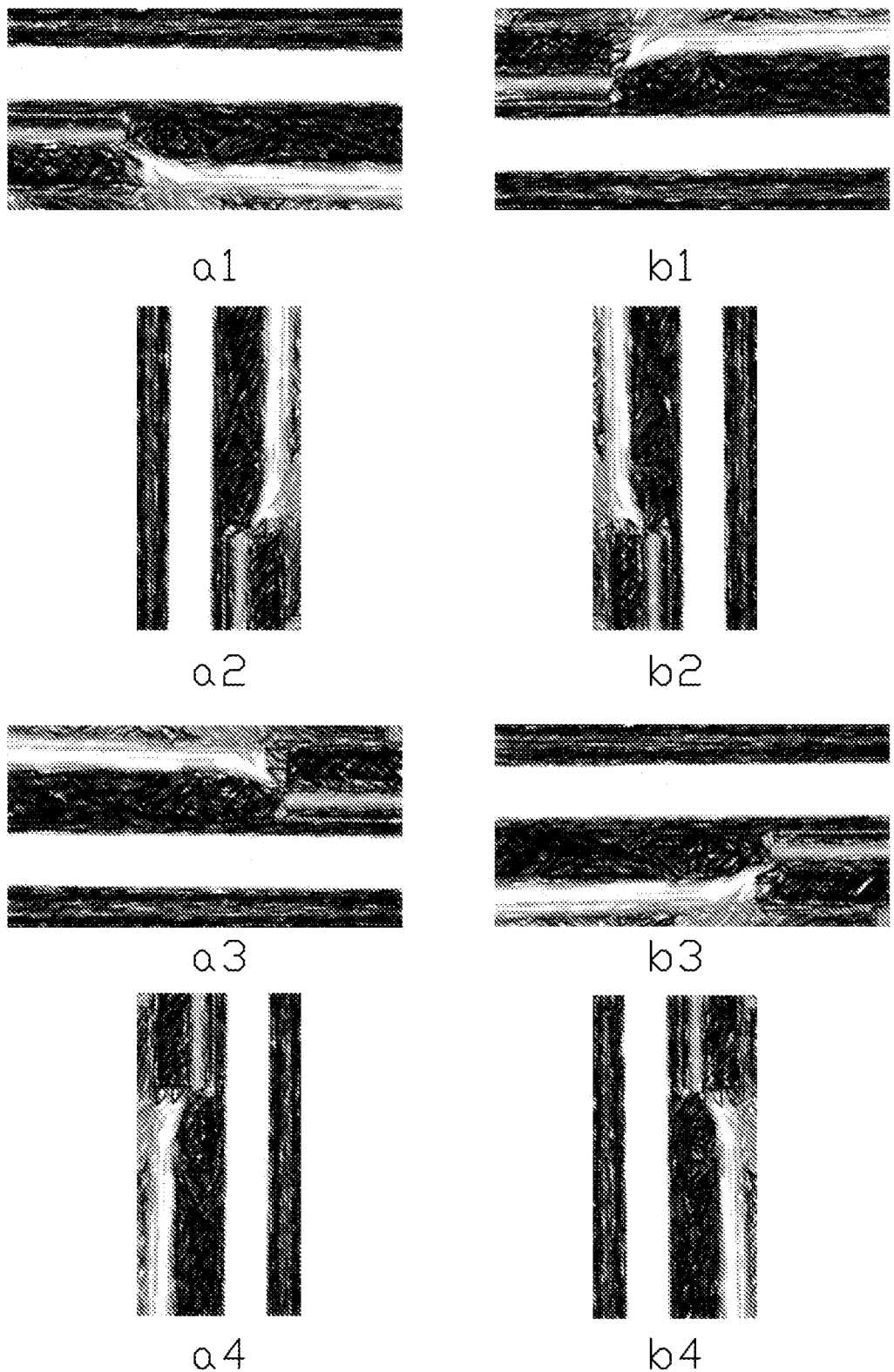
FIG. 3 shows multiple pictures derived from original picture that has been flipped and rotated.

FIG. 3 illustrates the multiple amplification pictures from an original picture that has been flipped and rotated. In one embodiment, N is 8, namely, the number of derived training pictures is 8 times that of the original picture.

First, the original picture a1 can be flipped to get the flip picture b1 after a vertical flip, and the original picture a1 and the flip picture b1 form a mirror symmetry. The number of training pictures is increased to two times the original one picture.

Then, the K is calculated according to the formula K=(8/2)−1=3, and the original picture a1 and the flip picture b1 are rotated three times in clockwise. Each time, a rotation angle is (2×360)/8=90°, namely, the rotation angle corresponding to the first time is 90° and the original pictures are rotated at 90° to get the first amplification pictures a1. The rotation angle corresponding to the second time is 180° and the original pictures are rotated at 180° to get the first amplification pictures a2. The rotation angle corresponding to the third time is 270° and the original pictures are rotated at 270° to get the first amplification pictures a3. The flip pictures b1 are rotated three times in clockwise direction to get the second amplification pictures b2, b3, and b4. After the original picture a1 and the flip picture b1 are so rotated, the number of the training pictures is increased to 8 times the original one picture.

The annotation module 330 annotates the original picture and annotates the amplification picture according to a preset conversion rule. In one embodiment, annotating the original pictures includes calculating the dimensional coordinate of the original picture and the point coordinates and format coordinates of the annotation site of the original picture. The dimensional coordinate is the outline of the original picture that represents the original picture, and the dimensional coordinates here are represented by $S=(S_x, S_y)$. In one embodiment, the coordinate value of the horizontal axes coordinate of the dimensional coordinate is determined according to unit areas of size in the horizontal axes coordinate of the dimensional coordinate. The coordinate value of the vertical axes coordinate of the dimensional coordinate is determined according to unit areas of size in the vertical axes coordinate of the dimensional coordinate.

In FIG. 3, the original picture occupies 6 unit areas of size in the horizontal axes coordinate, then the coordinate value of the horizontal axes coordinate $S_x$ is 7. The original picture occupies 4 units area of size in the vertical axes coordinate, then the coordinate value of the vertical axes coordinate $S_y$ is 5. The point coordinate is the coordinate of one of points in the annotation site, which is represented by $A=(X, Y)$. When the upper left corner of FIG. 3 is set as origin, the point coordinate $A=(4,3)$. The format coordinate consists of the minimum horizontal axes coordinate value of the annotation site in the original picture, the minimum vertical axes coordinate value of the annotation site in the original picture, the width of the annotation site in the original picture, and the height of the annotation site in the original picture. The format coordinate is represented by $Bbox=(X_{min}, Y_{min}, W, H)$. Therein, $X_{min}$ is the minimum coordinate value of the horizontal axes coordinates of the annotation site, $Y_{min}$ is the minimum coordinate value of vertical axes coordinates of the annotation site, W is the coordinate value of the width of the annotation site, and H is the coordinate value of the height of the annotation site. When the upper left corner of FIG. 3 is set as the origin, the $X_{min}$ is 4, the $Y_{min}$ is 3, the W is 2, and the H is 1, namely, the $Bbox=(4, 3, 2, 1)$.

The dimensional coordinate of the amplification picture, point coordinate of the amplification picture, and the format coordinate of the amplification picture are represented respectively by S', A' and Bbox'.

The preset conversion rule is as follows. The device converts the dimensional coordinate of the annotation site of the annotated original pictures to get the dimensional coordinate of the annotation site of the annotated amplification pictures and converts the dimensional coordinate of the annotation site of the annotated original pictures and the point coordinate of the annotation site of the annotated original pictures to get the point coordinate of the annotation site of the annotated amplification pictures. The rule also converts the dimensional coordinate of the annotation site of the annotated original pictures and the format coordinate of the annotation site of the annotated original pictures to get the format coordinate of the annotation site of the annotated amplification pictures.

In detail, the coordinate value of the dimensional coordinate of the amplification picture is the same as the coordinate value of the dimensional coordinate of the original picture, namely, $S'=S=(S_x, S_y)$. The coordinate value of the horizontal axes coordinate of the point coordinate in the amplification picture is same as the coordinate value of the horizontal axes coordinate of the point coordinate in the original picture. The coordinate value of the vertical axes coordinate of the point coordinate in the amplification picture can be calculated by making the coordinate value of the vertical axes coordinate of the dimensional coordinate in original picture subtract one and the coordinate value of the vertical axes coordinate of the point coordinate in original picture. Namely, the point coordinate of the amplification picture is $S'=(X, S_y-1-Y)$. The coordinate value of the horizontal axes coordinate of the point coordinate in the amplification picture is same as the coordinate value of the horizontal axes coordinate of the point coordinate in the original picture. The coordinate value of the horizontal axes coordinate of the format coordinate in the amplification picture is same as the coordinate value of the horizontal axes coordinate of the format coordinate in the original picture. The coordinate value of the vertical axes coordinate of the format coordinate in the amplification picture can be calculated by making the coordinate value of the vertical axes coordinate of the format coordinate in original picture subtract one, the coordinate value of the vertical axes coordinate of the format coordinate in the original picture, and the width of the format coordinate in the amplification picture. The coordinate value of the width of the annotation site in the amplification picture and the coordinate value of the height of the annotation site in the amplification picture remain unchanged during flip process and rotation process. Namely, the format coordinate of the amplification picture is $S'=(X_{min}, S_y-1-Y-H, W, H)$.

The derived pictures acquired by rotating the original picture at 90 degrees, 180 degrees, and 270 degrees are in the following table 1.

The storing module 340 stores the original picture, the amplification picture, the annotated original picture, and the annotated amplification picture, and names the original picture and the amplification picture to train an AI depth learning model.

The device 10 gets the annotated amplification picture from the original picture, and trains the AI depth learning model by using the annotated amplification picture to get an AI deep learning model with higher accuracy.

Figure 4:
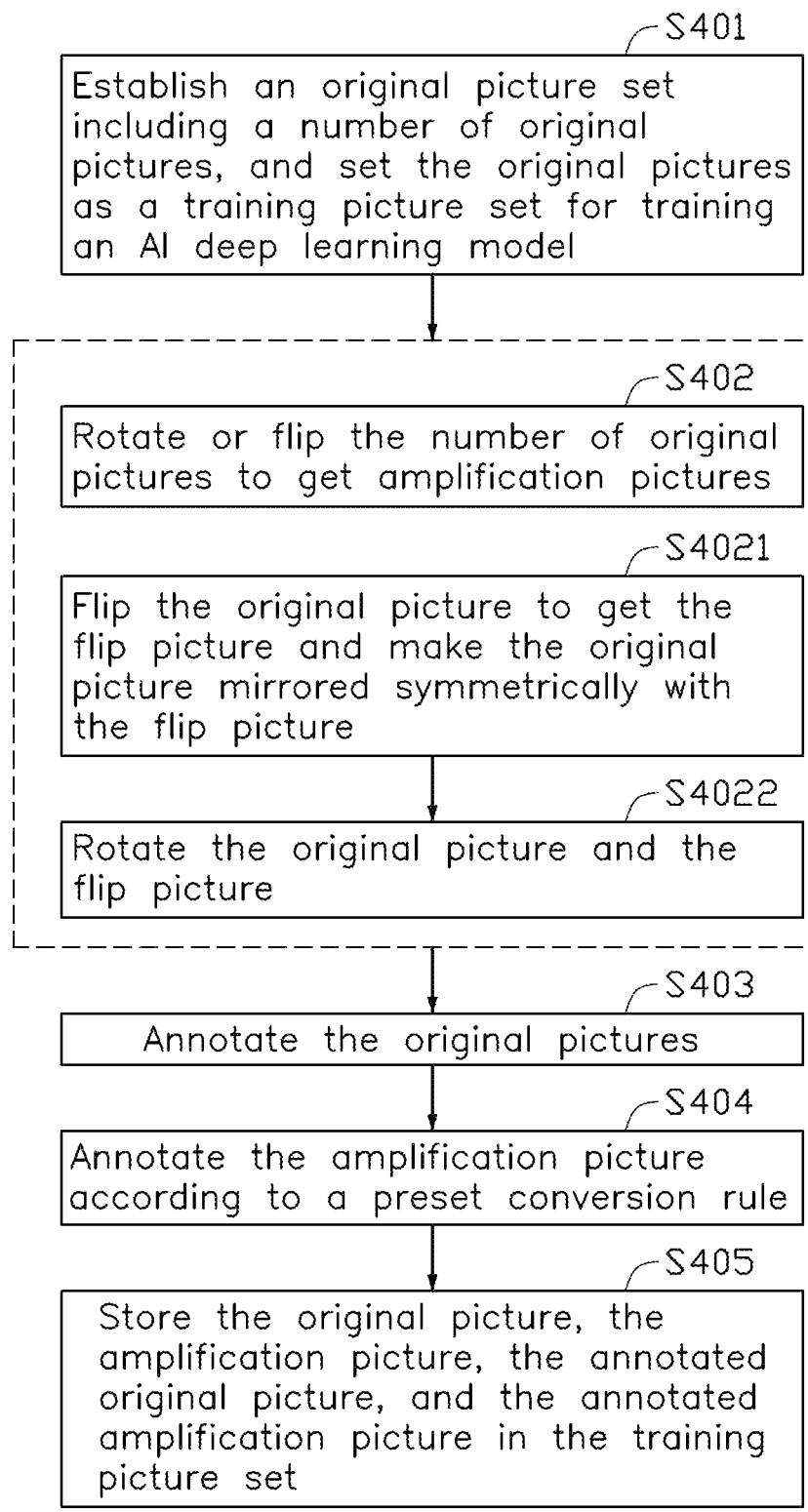
FIG. 4 is a flowchart of an embodiment of a method for deriving additional and further pictures from an original picture.

FIG. 4 illustrates a flowchart of an embodiment of a method for deriving additional and further pictures from an original picture. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the device establishes an original picture set including a number of original pictures, and sets the original pictures as a training picture set for training an AI deep learning model.

In one embodiment, the device acquires the original pictures from an external device, and establishes the original picture set according to the original pictures. The external device can be picture database.

In another embodiment, the device annotates the original picture, establishes the training picture set according to the annotated original pictures for training an AI deep learning model.

At block 402, the device rotates or flips the number of original pictures to get amplification pictures.

In one embodiment, the device flips and rotates the original picture to get the amplification pictures, and establish an amplification picture set based on the amplification pictures. The amplification picture set is used to increase the number of the training picture s for training the AI deep learning model.

In one embodiment, the method further includes: at block 4021, the device flips the original picture to get the flip picture and makes the original picture mirrored symmetrically with the flip picture; at block 4022, the device rotates the original picture through a preset angle to get a first amplification picture and rotates the flip picture in the same direction to get a second amplification picture. In at least one embodiment, the preset angle is in a range between 0° and 360°.

In one embodiment, the device rotates the original pictures K times at the preset angle to get the first amplification pictures, and rotates the flipped pictures K times at the preset angle in the same direction to get the second amplification pictures. The first amplification pictures and the second amplification pictures forms the training pictures. The preset angle can be calculated according to formula θ=(2×270°)/N, wherein K is calculated according to formula K=(N/2)−1, N is a multiple of the number of the amplification pictures (namely the first amplification picture and the second amplification picture) and N is an even number. Depending on the multiple of the number of the amplification picture, the original picture or the flipped pictures are rotated 90 degrees, 180 degrees, or 270 degrees, respectively.

In one embodiment, the N is 8, namely, the number of training picture is 8 times that of the original picture.

First, the original picture a1 can be flipped to get the flip picture b1 after a vertical flip, and the original picture a1 and the flip picture b1 form a mirror symmetry. The number of training pictures is increases to two times the original one picture.

Then, the K is calculated according to the formula K=(8/2)−1=3, and the original picture a1 and the flip picture b1 are rotated three times along in clockwise. Each time, a rotation angle is (2×360)/8=90°, namely, the rotation angle corresponding to the first time is 90° and the original pictures are rotated at 90° to get the first amplification pictures a1. The rotation angle corresponding to the second time is 180° and the original pictures are rotated at 180° to get the first amplification pictures a2. The rotation angle corresponding to the third time is 270° and the original pictures are rotated at 270° to get the first amplification pictures a3. The flip pictures b1 are rotated three times in clockwise to get the second amplification pictures b2, b3, and b4. After the original picture a1 and the flip picture b1 are so rotated, the number of the training pictures is increased to 8 times the original one picture.

At block 403, the device annotates the original pictures.

In one embodiment, annotating the original pictures includes calculating the dimensional coordinates of the original pictures and the point coordinates and format coordinates of the annotation site of the original pictures. The dimensional coordinates are the outline of the original picture that represents the original picture, and the dimensional coordinates here are represented by $S=(S_x, S_y)$. In one embodiment, the coordinate value of the horizontal axes coordinate of the dimensional coordinate is determined according to unit areas of size in the horizontal axes coordinate of the dimensional coordinate, and the coordinate value of the vertical axes coordinate of the dimensional coordinate is determined according to unit areas of size in the vertical axes coordinate of the dimensional coordinate.

In FIG. 3, the original picture occupies 6 unit areas of size in the horizontal axes coordinate, then the coordinate value of the horizontal axes coordinate $S_x$ is 7. The original picture occupies 4 units area of size in the vertical axes coordinate, then the coordinate value of the vertical axes coordinate $S_y$ is 5. The point coordinate is the coordinate of one of points in the annotation site, which is represented by A=(X, Y). When the upper left corner of FIG. 3 is set as origin, and the point coordinate A=(4,3). The format coordinate consists of the minimum horizontal axes coordinate value the annotation site in the original picture, the minimum vertical axes coordinate value the annotation site in the original picture, the width of the annotation site in the original picture, and the height of the annotation site in the original picture. The format coordinate is represented by Bbox=$(X_{min}, Y_{min}, W, H)$. Therein $X_{min}$ is the minimum coordinate value of the horizontal axes coordinates of the annotation site, $Y_{min}$ is the minimum coordinate value of vertical axes coordinates of the annotation site, W is the coordinate value of the width of the annotation site, and H is the coordinate value of the height of the annotation site. When the cupper left corner of FIG. 3 is set as origin, and $X_{min}$ is 4, $Y_{min}$ is 3, W is 2, and H is 1, namely, Bbox=(4, 3, 2, 1).

At block 404, the device annotates the amplification picture according to a preset conversion rule.

The dimensional coordinate of the amplification picture, point coordinate of the amplification picture and the format coordinate of the amplification picture are represented respectively by S', A' and Bbox'.

The preset conversion rule is illustrated as follow. The device convert the dimensional coordinate of the annotation site of the annotated original pictures to get the dimensional coordinate of the annotation site of the annotated amplification pictures, convert the dimensional coordinate of the annotation site of the annotated original pictures and the point coordinate of the annotation site of the annotated original pictures to get the point coordinate of the annotation site of the annotated amplification pictures, and convert the dimensional coordinate of the annotation site of the annotated original pictures and the format coordinate of the annotation site of the annotated original pictures to get the format coordinate of the annotation site of the annotated amplification pictures.

In detail, the coordinate value of the dimensional coordinate of the amplification picture is the same as the coordinate value of the dimensional coordinate of the original picture, namely, $S'=S=(S_x, S_y)$. The coordinate value of the horizontal axes coordinate of the point coordinate in the amplification picture is same as the coordinate value of the horizontal axes coordinate of the point coordinate in the original picture. The coordinate value of the vertical axes coordinate of the point coordinate in the amplification picture can be calculated by making the coordinate value of the vertical axes coordinate of the dimensional coordinate in original picture subtract one and the coordinate value of the vertical axes coordinate of the point coordinate in original picture. Namely, the point coordinate of the amplification picture is $S'=(X, S_y-1-Y)$. The coordinate value of the horizontal axes coordinate of the point coordinate in the amplification picture is as same as the coordinate value of the horizontal axes coordinate of the point coordinate in the original picture. The coordinate value of the horizontal axes coordinate of the format coordinate in the amplification picture is as same as the coordinate value of the horizontal axes coordinate of the format coordinate in the original picture. The coordinate value of the vertical axes coordinate of the format coordinate in the amplification picture can be calculated by making the coordinate value of the vertical axes coordinate of the format coordinate in original picture subtract one, the coordinate value of the vertical axes coordinate of the format coordinate in the original picture, and the width of the format coordinate in the amplification picture. The coordinate value of the width of the annotation site in the amplification picture and the coordinate value of the height of the annotation site in the amplification picture remain unchanged during flip process and rotation process. Namely, the format coordinate of the amplification picture is $S'=(X_{min}, S_y-1-Y-H, W, H)$.

The pictures which are acquired by rotating the original picture at 90 degrees, 180 degrees, and 270 degrees are illustrated in the following table 1.

At block 405, the device stores the original picture, the amplification picture, the annotated original picture, and the annotated amplification picture in the training picture set.

The device for picture amplification and annotation gets the annotated amplification picture from the original picture, and trains the AI depth learning model by using the annotated amplification picture and the original picture to get a higher accuracy AI deep learning model.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for deriving additional and further pictures from an original picture, comprising:
    establishing an original picture set comprising a plurality of original pictures, and setting the original pictures as a training picture set for training an AI deep learning model;
    rotating or flipping the plurality of original pictures and obtaining amplification pictures;
    annotating the original pictures;
    annotating the amplification picture according to a preset conversion rule; and
    storing the original picture, the amplification picture, the annotated original picture, and the annotated amplification picture in the training picture set;
    flipping the original pictures to obtain flip pictures wherein the flip pictures are symmetrically mirrored with the original pictures; and
    rotating the original picture by a preset angle to obtain a first amplification picture and rotating the flip picture in the same direction and by the preset angle to obtain a second amplification picture.

2. The method as recited in claim 1, wherein the preset angle is in a range between 0° and 360°.

3. The method as recited in claim 1, further comprising:
    rotating the original pictures K times by the preset angle to obtain the first amplification pictures, and rotating the flipped pictures K times by the preset angle in the same direction to obtain the second amplification pictures, wherein the preset angle is calculated according to a formula $\theta=(2\times270°)/N$, wherein K is calculated according to a formula $K=(N/2)-1$, N is a multiple of a number of the first amplification picture and a number of the second amplification picture, and N is an even number.

4. The method as recited in claim 1, wherein annotating the original pictures comprising calculating dimensional coordinates of the original pictures, point coordinates and format coordinates of annotation site of the original pictures, the dimensional coordinates are an outline of the original pictures, and the coordinate value of the horizontal axes coordinate of the dimensional coordinates is determined according to unit areas of size in the horizontal axes coordinate of the dimensional coordinates, and the coordinate value of the vertical axes coordinate of the dimensional coordinates is determined according to unit areas of size in the vertical axes coordinate of the dimensional coordinate, the format coordinate is consisted of a minimum horizontal axes coordinate value of the annotation site in the original picture, a minimum vertical axes coordinate value of the annotation site in the original picture, the width of the annotation site in the original picture, and the height of the annotation site in the original picture.

5. The method as recited in claim 4, further comprising:
    converting the dimensional coordinate of the annotation site of the annotated original pictures to obtain the dimensional coordinate of the annotation site of the annotated amplification pictures;
    converting the dimensional coordinate of the annotation site of the annotated original pictures and the point coordinate of the annotation site of the annotated original pictures to obtain the point coordinate of the annotation site of the annotated amplification pictures; and
    converting the dimensional coordinate of the annotation site of the annotated original pictures and the format coordinate of the annotation site of the annotated original pictures to obtain the format coordinate of the annotation site of the annotated amplification pictures.

6. The method as recited in claim 5, wherein a coordinate value of the dimensional coordinate of the amplification picture is the same as the coordinate value of the dimensional coordinate of the original picture, the coordinate value of the horizontal axes coordinate of the point coordinate in the amplification picture is as same as the coordinate value of the horizontal axes coordinate of the point coordinate in the original picture, the coordinate value of the vertical axes coordinate of the point coordinate in the amplification picture is calculated by subtracting the coordinate value of the vertical axes coordinate of the dimensional coordinate in the original picture by one (1) and by the coordinate value of the vertical axes coordinate of the point coordinate in original picture, the coordinate value of the horizontal axes coordinate of the point coordinate in the amplification picture is same as the coordinate value of the horizontal axes coordinate of the point coordinate in the original picture, the coordinate value of the horizontal axes coordinate of the format coordinate in the amplification picture is same as the coordinate value of the horizontal axes coordinate of the format coordinate in the original picture, the coordinate value of the vertical axes coordinate of the format coordinate in the amplification picture is calculated by subtracting the coordinate value of the vertical axes coordinate of the format coordinate in the original picture by one (1), and by the coordinate value of the vertical axes coordinate of the format coordinate in the original picture, and by the width of the format coordinate in the amplification picture, the coordinate value of the width of the annotation site in the amplification picture and the coordinate value of the height of the annotation site in the amplification picture are unchanged during flip process and rotation process.

7. A device for deriving additional and further pictures from an original picture, comprising:
 a processor;
 a non-transitory storage medium coupled to the processor and configured to store a plurality of instructions, which causes the device to:
  establish an original picture set comprising a plurality of original pictures, and set the original pictures as a training picture set for training an AI deep learning model;
  rotate or flipping the plurality of original pictures and obtaining amplification pictures;
  annotate the original pictures;
  annotate the amplification picture according to a preset conversion rule; and
  store the original picture, the amplification picture, the annotated original picture, and the annotated amplification picture in the training picture set;
 flip the original pictures to obtain flip pictures, wherein the flip pictures are symmetrically mirrored with the flip picture; and
 rotate the original picture by a preset angle to obtain a first amplification picture and rotate the flip picture in the same direction and by the preset angle to get a second amplification picture.

8. The device as recited in claim 7, wherein the preset angle is in a range between 0° and 360°.

9. The device as recited in claim 7, wherein the plurality of instructions is further configured to cause the device:
 rotate the original pictures K times by the preset angle to obtain the first amplification pictures, and rotate the flipped pictures K times by the preset angle in the same direction with rotating the original pictures to obtain the second amplification pictures, wherein the preset angle is calculated according to a formula θ=(2×270°)/N, and K is calculated according to a formula K=(N/2)−1, N is a multiple of a number of the first amplification picture and a number of the second amplification picture, and N is an even number.

10. The device as recited in claim 7, wherein annotating the original pictures comprising calculating dimensional coordinates of the original pictures, point coordinates and format coordinates of annotation site of the original pictures, the dimensional coordinates are an outline of the original pictures, and the coordinate value of the horizontal axes coordinate of the dimensional coordinates is determined according to unit areas of size in the horizontal axes coordinate of the dimensional coordinates, and the coordinate value of the vertical axes coordinate of the dimensional coordinates is determined according to unit areas of size in the vertical axes coordinate of the dimensional coordinate, the format coordinate is consisted of a minimum horizontal axes coordinate value of the annotation site in the original picture, a minimum vertical axes coordinate value of the annotation site in the original picture, the width of the annotation site in the original picture, and the height of the annotation site in the original picture.

11. The device as recited in claim 10, wherein the plurality of instructions is further configured to cause the device:
 convert the dimensional coordinate of the annotation site of the annotated original pictures to obtain the dimensional coordinate of the annotation site of the annotated amplification pictures;
 convert the dimensional coordinate of the annotation site of the annotated original pictures and the point coordinate of the annotation site of the annotated original pictures to obtain the point coordinate of the annotation site of the annotated amplification pictures; and
 convert the dimensional coordinate of the annotation site of the annotated original pictures and the format coordinate of the annotation site of the annotated original pictures to obtain the format coordinate of the annotation site of the annotated amplification pictures.

12. The device as recited in claim 11, wherein a coordinate value of the dimensional coordinate of the amplification picture is the same as the coordinate value of the dimensional coordinate of the original picture, the coordinate value of the horizontal axes coordinate of the point coordinate in the amplification picture is same as the coordinate value of the horizontal axes coordinate of the point coordinate in the original picture, the coordinate value of the vertical axes coordinate of the point coordinate in the amplification picture is calculated by subtracting the coordinate value of the vertical axes coordinate of the dimensional coordinate in the original picture by one and by the coordinate value of the vertical axes coordinate of the point coordinate in original picture, the coordinate value of the horizontal axes coordinate of the point coordinate in the amplification picture is same as the coordinate value of the horizontal axes coordinate of the point coordinate in the original picture, the coordinate value of the horizontal axes coordinate of the format coordinate in the amplification picture is as same as the coordinate value of the horizontal axes coordinate of the format coordinate in the original picture, the coordinate value of the vertical axes coordinate of the format coordinate in the amplification picture is calculated by subtracting the coordinate value of the vertical axes coordinate of the format coordinate in the original picture by one, by the coordinate value of the vertical axes coordinate of the format coordinate in the original picture, and by the width of the format coordinate in the amplification picture, the coordinate value of the width of the annotation site in the amplification picture and the coordinate value of the height of the annotation site in the amplification picture are unchanged during flip process and rotation process.

13. A non-transitory storage medium having stored thereon instructions that, when executed a processor of a device for picture amplification and annotation, causes the processor to execute instructions of a method for picture amplification and annotation, the method comprising:
- establishing an original picture set comprising a plurality of original pictures, and setting the original pictures as a training picture set for training an AI deep learning model;
- rotating or flipping the plurality of original pictures and obtaining amplification pictures;
- annotating the original pictures;
- annotating the amplification picture according to a preset conversion rule; and
- storing the original picture, the amplification picture, the annotated original picture, and the annotated amplification picture in the training picture set;
- flipping the original pictures to obtain flip pictures, wherein the flip pictures are symmetrically mirrored with the flip picture; and rotating the original picture by a preset angle to obtain a first amplification picture; and
- rotating the flip picture in the same direction and by the preset angle to obtain a second amplification picture.

14. The non-transitory storage medium as recited in claim 13, wherein the preset angle is in a range between 0° and 360°.

15. The non-transitory storage medium as recited in claim 13, wherein the method is further comprising:
- rotating the original pictures K times by the preset angle to obtain the first amplification pictures, and rotating the flipped pictures K times by the preset angle in the same direction with rotating the original pictures to obtain the second amplification pictures, wherein the preset angle is calculated according to a formula $\theta=(2\times 270°)/N$, wherein K is calculated according to a formula $K=(N/2)-1$, N is a multiple of a number of the first amplification picture and a number of the second amplification picture, and N is an even number.

16. The non-transitory storage medium as recited in claim 13, wherein annotating the original pictures comprising calculating dimensional coordinates of the original pictures, point coordinates and format coordinates of annotation site of the original pictures, the dimensional coordinates are an outline of the original pictures, and the coordinate value of the horizontal axes coordinate of the dimensional coordinates is determined according to unit areas of size in the horizontal axes coordinate of the dimensional coordinates, and the coordinate value of the vertical axes coordinate of the dimensional coordinates is determined according to unit areas of size in the vertical axes coordinate of the dimensional coordinate, the format coordinate is consisted of a minimum horizontal axes coordinate value of the annotation site in the original picture, a minimum vertical axes coordinate value of the annotation site in the original picture, the width of the annotation site in the original picture, and the height of the annotation site in the original picture.

17. The non-transitory storage medium as recited in claim 16, wherein the method is further comprising:
- converting the dimensional coordinate of the annotation site of the annotated original pictures to obtain the dimensional coordinate of the annotation site of the annotated amplification pictures;
- converting the dimensional coordinate of the annotation site of the annotated original pictures and the point coordinate of the annotation site of the annotated original pictures to obtain the point coordinate of the annotation site of the annotated amplification pictures; and
- converting the dimensional coordinate of the annotation site of the annotated original pictures and the format coordinate of the annotation site of the annotated original pictures to obtain the format coordinate of the annotation site of the annotated amplification pictures.

* * * * *